United States Patent
Ogawa

(10) Patent No.: US 9,363,290 B2
(45) Date of Patent: Jun. 7, 2016

(54) ACCESS CONTROL INFORMATION GENERATING SYSTEM

(75) Inventor: Ryuichi Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 427 days.

(21) Appl. No.: 13/821,850

(22) PCT Filed: Aug. 23, 2011

(86) PCT No.: PCT/JP2011/004663
§ 371 (c)(1),
(2), (4) Date: Mar. 8, 2013

(87) PCT Pub. No.: WO2012/042734
PCT Pub. Date: Apr. 5, 2012

(65) Prior Publication Data
US 2013/0174217 A1   Jul. 4, 2013

(30) Foreign Application Priority Data

Sep. 27, 2010  (JP) .................................. 2010-214748

(51) Int. Cl.
*H04L 29/06* (2006.01)
*H04L 12/24* (2006.01)
*G06F 21/62* (2013.01)

(52) U.S. Cl.
CPC ............ *H04L 63/20* (2013.01); *G06F 21/6218* (2013.01); *H04L 41/0893* (2013.01); *H04L 63/0263* (2013.01); *H04L 63/10* (2013.01)

(58) Field of Classification Search
None
See application file for complete search history.

(56) References Cited

U.S. PATENT DOCUMENTS 6,167,445 A * 12/2000 Gai .................... H04L 41/0893
 709/220
7,437,550 B2 * 10/2008 Savage ................ G06Q 20/383
 705/74

(Continued)

FOREIGN PATENT DOCUMENTS

| JP | 2004-048340 A | 2/2004 |
| JP | 2004-220120 A | 8/2004 |
| JP | 2006-025203 A | 1/2006 |

OTHER PUBLICATIONS

Prnjat, Ognjen; Liabotis, Ioannis; Olukemi, Temitope; Sacks, Lionel; Fisher, Mike; McKee, Paul; Carlberg, Ken; Martinez, Gregorio. Policy-based Management for Alan-Enabled Networks. Third International Workshop on Policies for Distributed Systems and Networks. Pub. Date: 2002. http://ieeexplore.ieee.org/stamp/stamp.jsp?tp=&arnumber=1011305.*

(Continued)

*Primary Examiner* — Jeremiah Avery
(74) *Attorney, Agent, or Firm* — Sughrue Mion, PLLC

(57) ABSTRACT

A system 100 stores policy information in which role identification information, resource group identification information and action information are associated with each other (101), stores user identification information and role identification information in association with each other (102), receives an access request including user identification information for identifying a user of a client device (103), generates access control information based on the policy information and transmits the generated access control information to an access target device (104), acquires address information of a transmission source of the access request (105), and generates communication filter information representing permission for communication relating to an address represented by the acquired address information and transmits the generated communication filter information to a communication filter device specified based on the policy information (106).

13 Claims, 10 Drawing Sheets

(56) References Cited

U.S. PATENT DOCUMENTS

| | | | | |
|---|---|---|---|---|
| 8,347,088 | B2* | 1/2013 | Moore | G06F 19/327 713/166 |
| 2003/0051026 | A1* | 3/2003 | Carter | H04L 12/24 709/224 |
| 2003/0123465 | A1* | 7/2003 | Donahue | H04L 45/02 370/401 |
| 2003/0126468 | A1* | 7/2003 | Markham | H04L 63/0218 726/13 |
| 2006/0031407 | A1* | 2/2006 | Dispensa | H04L 29/12009 709/219 |
| 2007/0143827 | A1* | 6/2007 | Nicodemus | G06F 21/6218 726/2 |
| 2007/0143851 | A1* | 6/2007 | Nicodemus | G06F 21/55 726/25 |
| 2007/0214352 | A1* | 9/2007 | Convery | H04L 29/12301 713/153 |
| 2008/0155647 | A1* | 6/2008 | Miyawaki | H04L 63/0227 726/1 |
| 2008/0301765 | A1* | 12/2008 | Nicol | H04L 41/142 726/1 |
| 2009/0158302 | A1* | 6/2009 | Nicodemus | G06F 21/577 719/328 |
| 2009/0320088 | A1* | 12/2009 | Gill | G06F 21/604 726/1 |

OTHER PUBLICATIONS

Kovacshazi, Zsolt; Vida, Rolland. Host Identity Specific Multicast. Third International Conference on Networking and Servicess. Pub. Date: 2007. http://ieeexplore.ieee.org/stamp/stamp.jsp?tp=&arnumber=4438250.*

Mitseva, Anelia; Wardana, Satya Ardhy; Prasad, Neeli R. Context-Aware Privacy Protection for Wireless Sensor Networks iin Hybrid Hierarchical Architecture. 2008 International Wireless Communications and Mobile Computing Conference. IWCMC '08. http://ieeexplore.ieee.org/stamp/stamp.jsp?tp=&arnumber=4600033.*

Communication dated Nov. 4, 2015, from the Japanese Patent Office in counterpart application No. 2012-536159.

Ryuichi Ogawa, et al., "Authority Management Infrastructure for the Virtual Server Integrated Environment" NEC Technical Journal by NEC Corporation, Apr. 2010, pp. 129-133, vol. 63, No. 2.

Ryuichi Ogawa, "Access policy management architecture for virtual server consolidation systems", IEICE Technical Report, Jun. 24, 2010, pp. 93-100, vol. 110, No. 113.

International Search Report of PCT/JP2011/004663, dated Sep. 20, 2011.

* cited by examiner

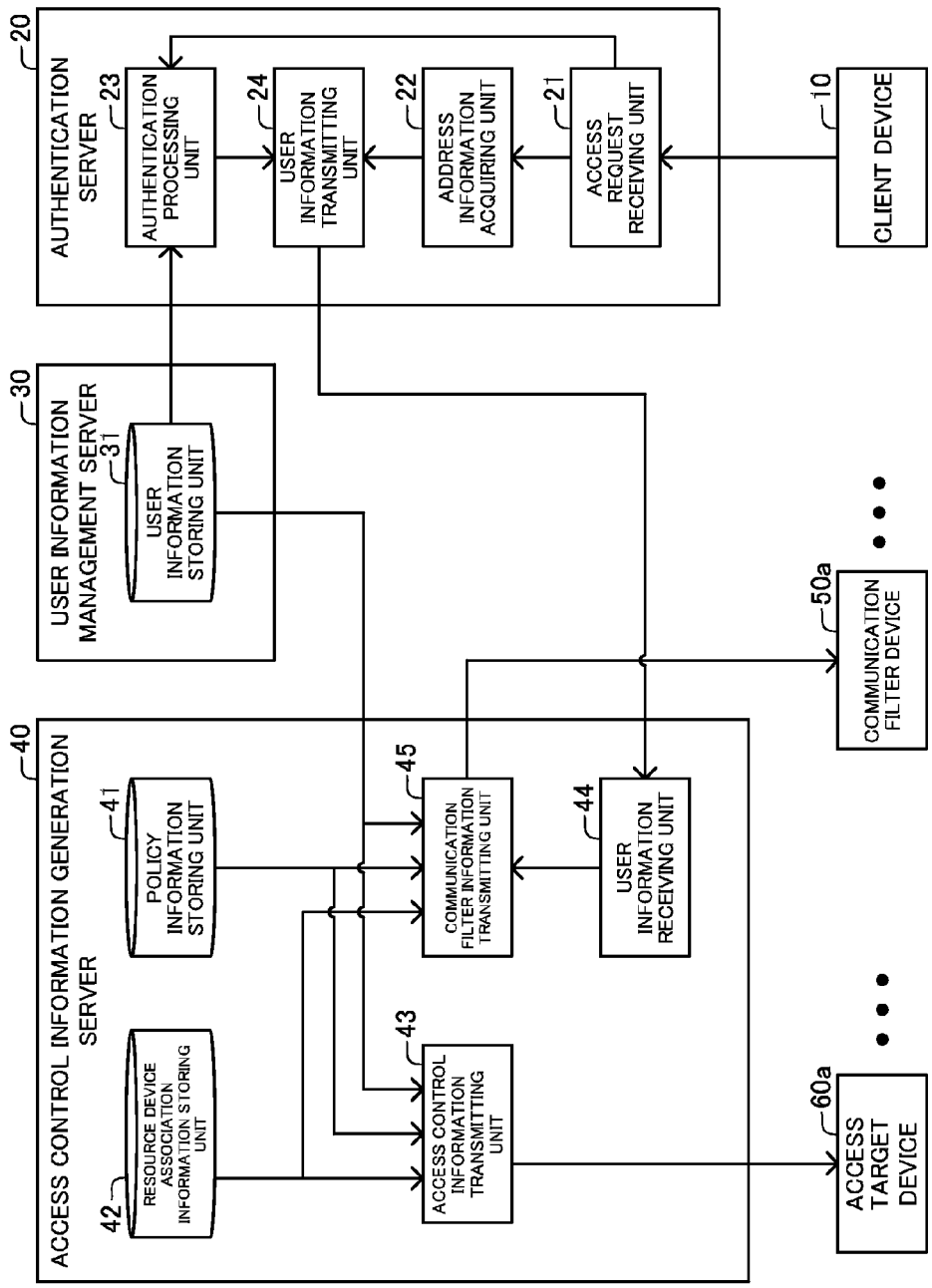

Fig.3

| ROLE IDENTIFICATION INFORMATION | USER IDENTIFICATION INFORMATION | PASSWORD INFORMATION |
|---|---|---|
| RollID1 | UID1 | PW1 |
| ... | ... | ... |

Fig.4

| ROLE IDENTIFICATION INFORMATION | RESOURCE GROUP IDENTIFICATION INFORMATION | ACTION INFORMATION |
|---|---|---|
| RollID1 | RGID1 | AC1 |
| ... | ... | ... |

Fig.5

| RESOURCE GROUP IDENTIFICATION INFORMATION | COMMUNICATION FILTER DEVICE IDENTIFICATION INFORMATION | ACCESS TARGET DEVICE IDENTIFICATION INFORMATION |
|---|---|---|
| RGID1 | CD1 | AD1 |
| ... | ... | ... |

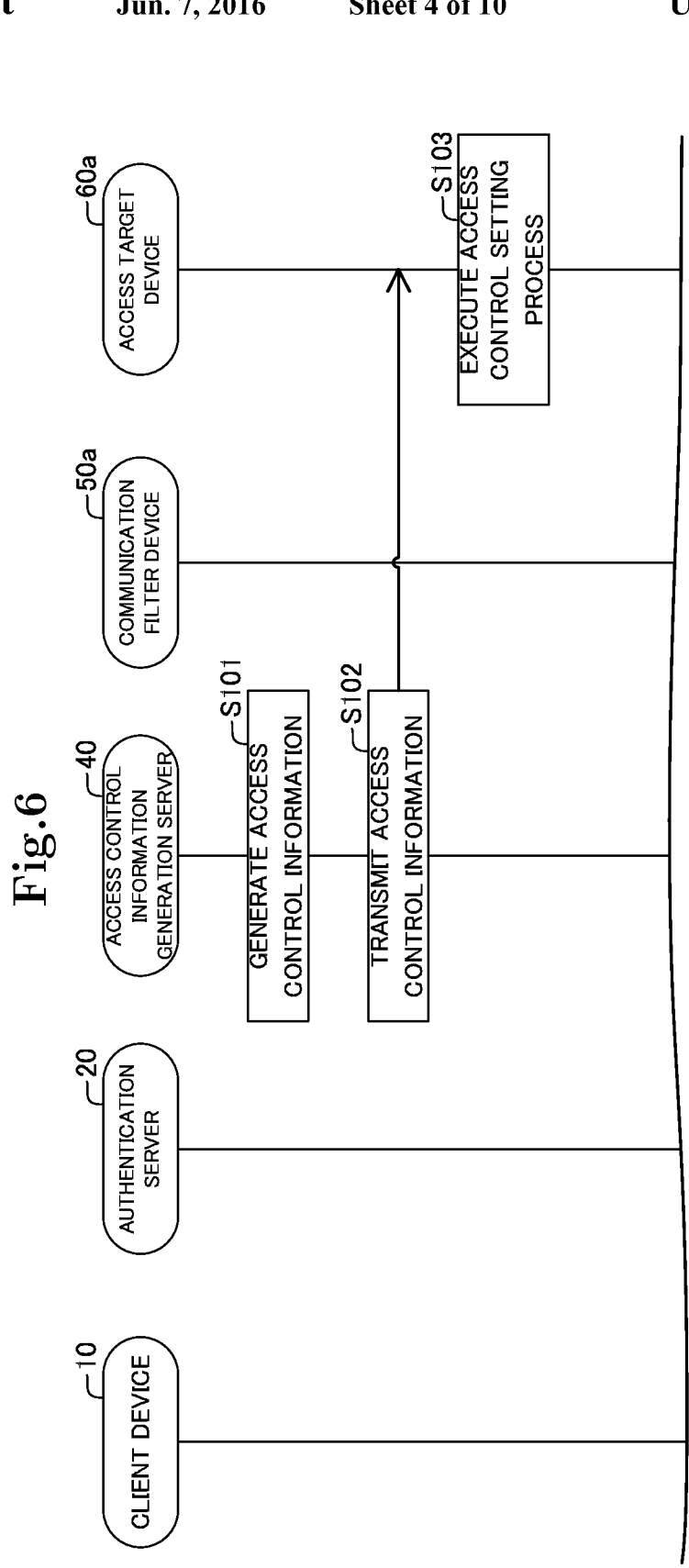

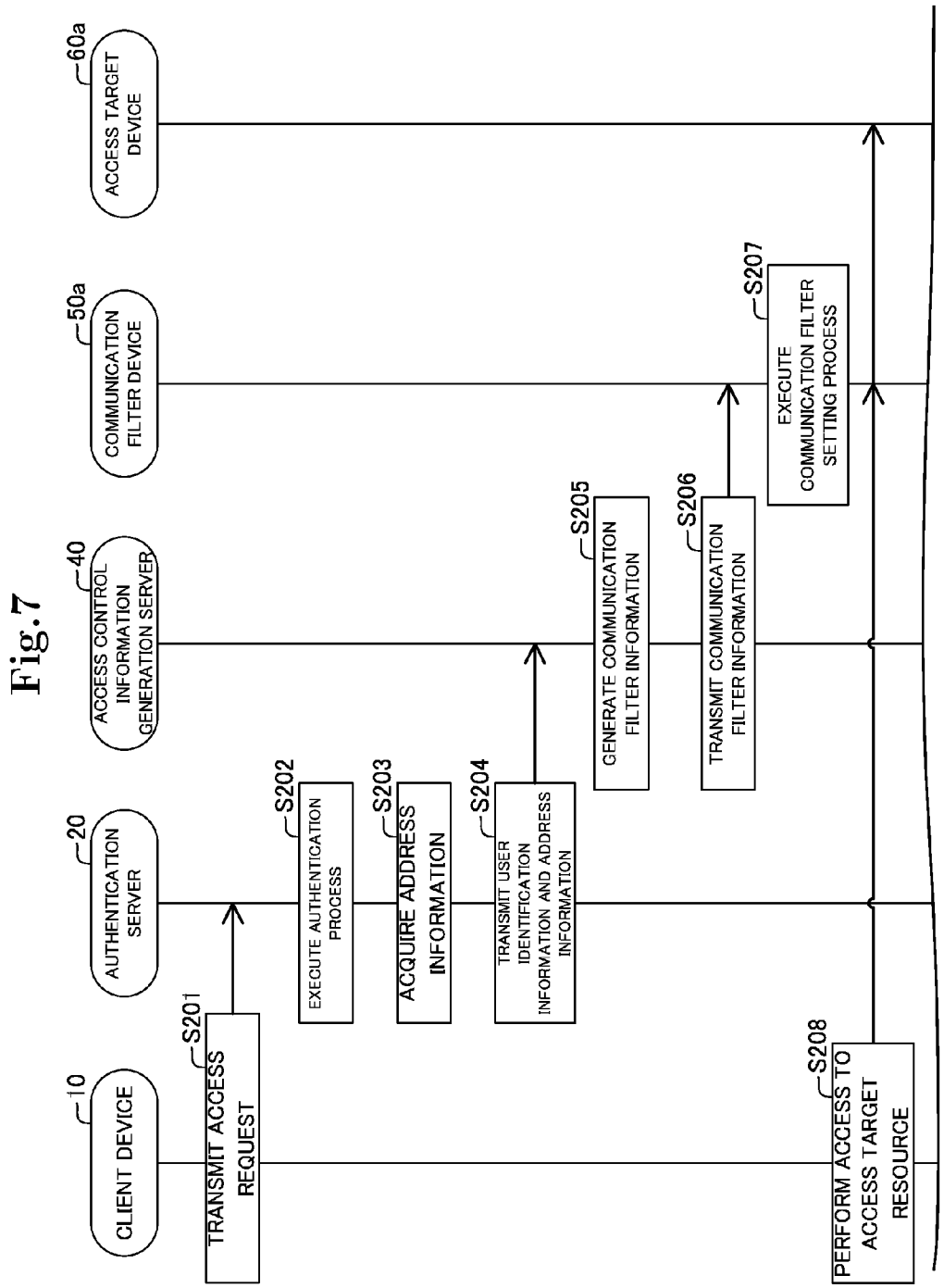

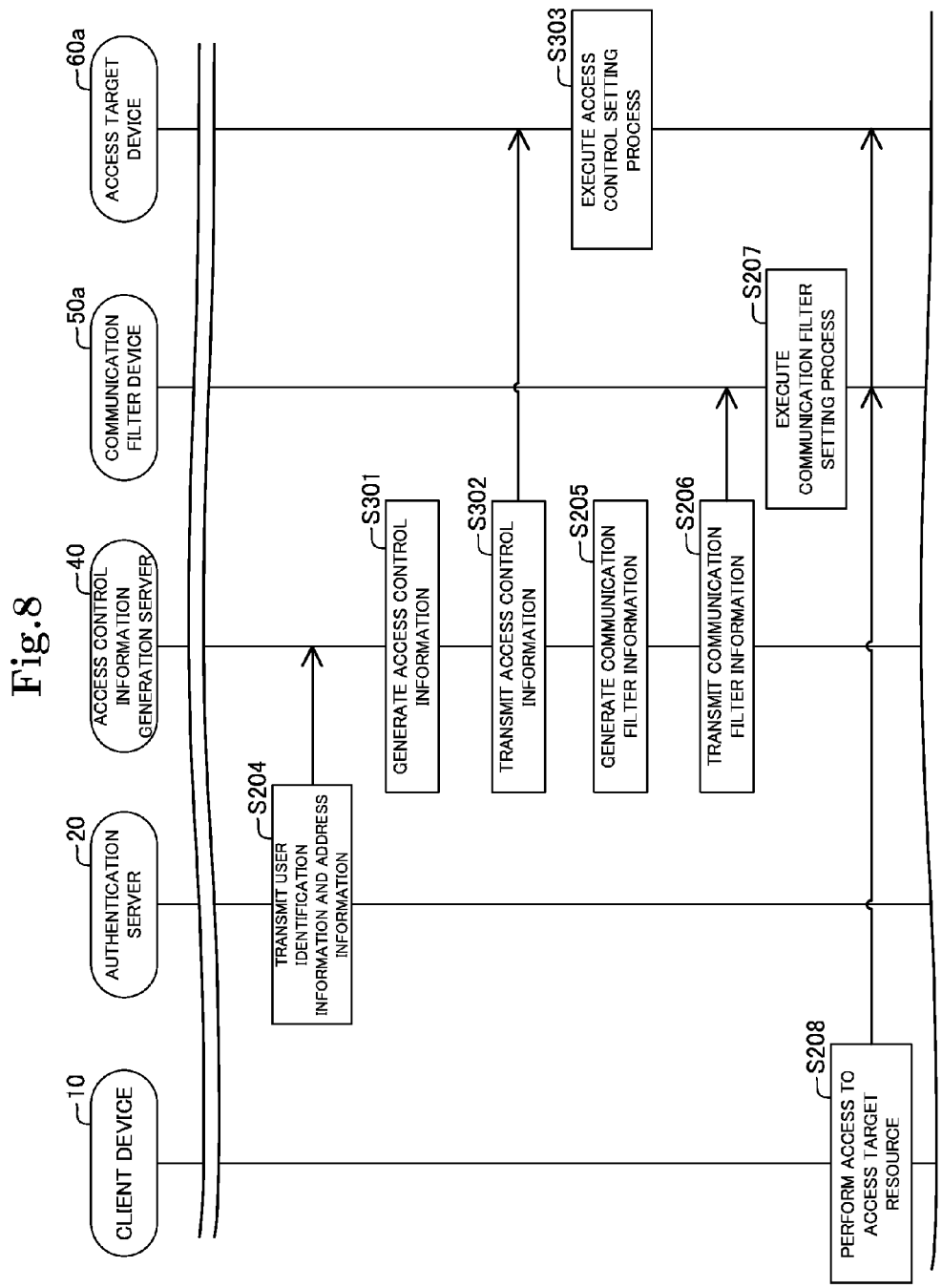

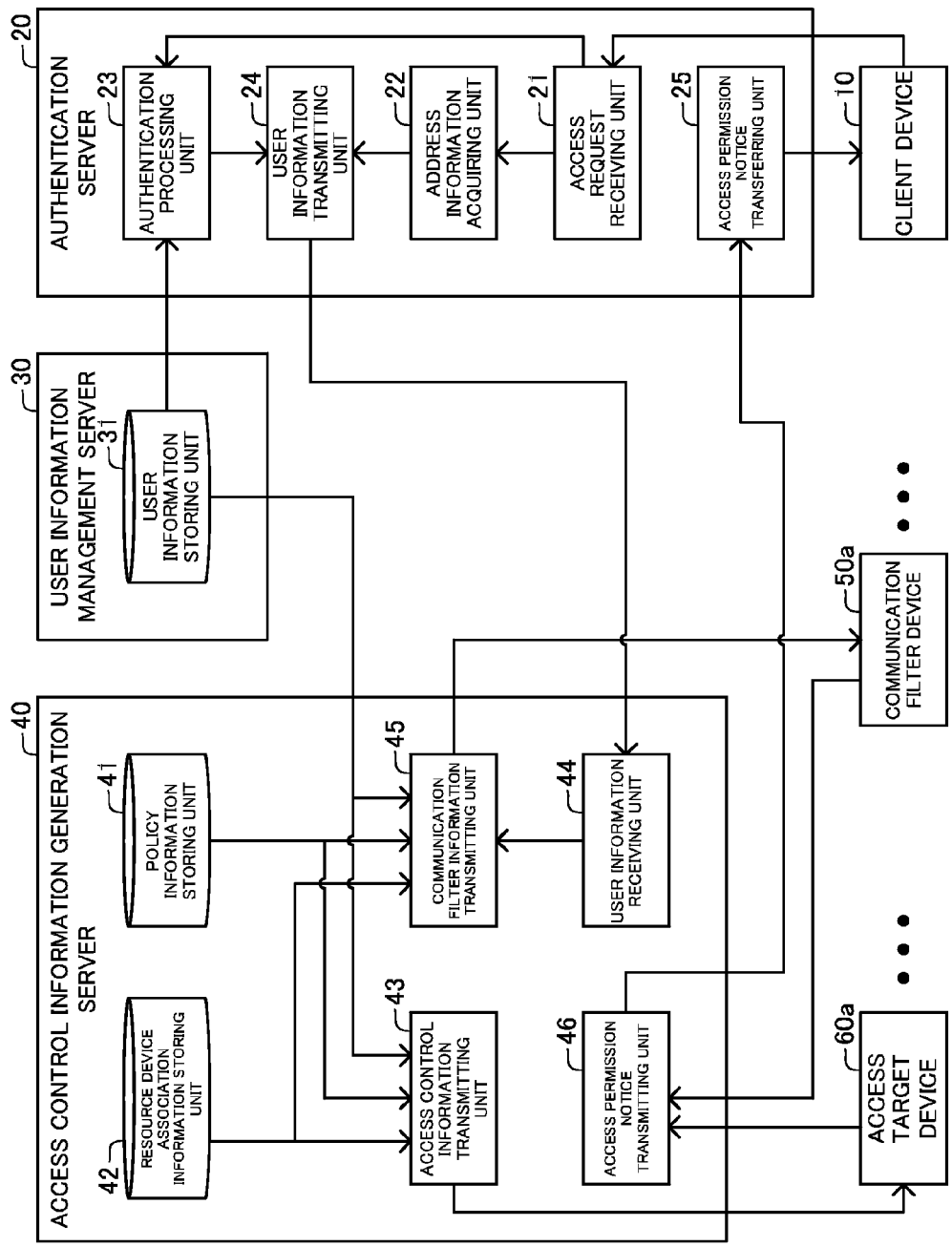

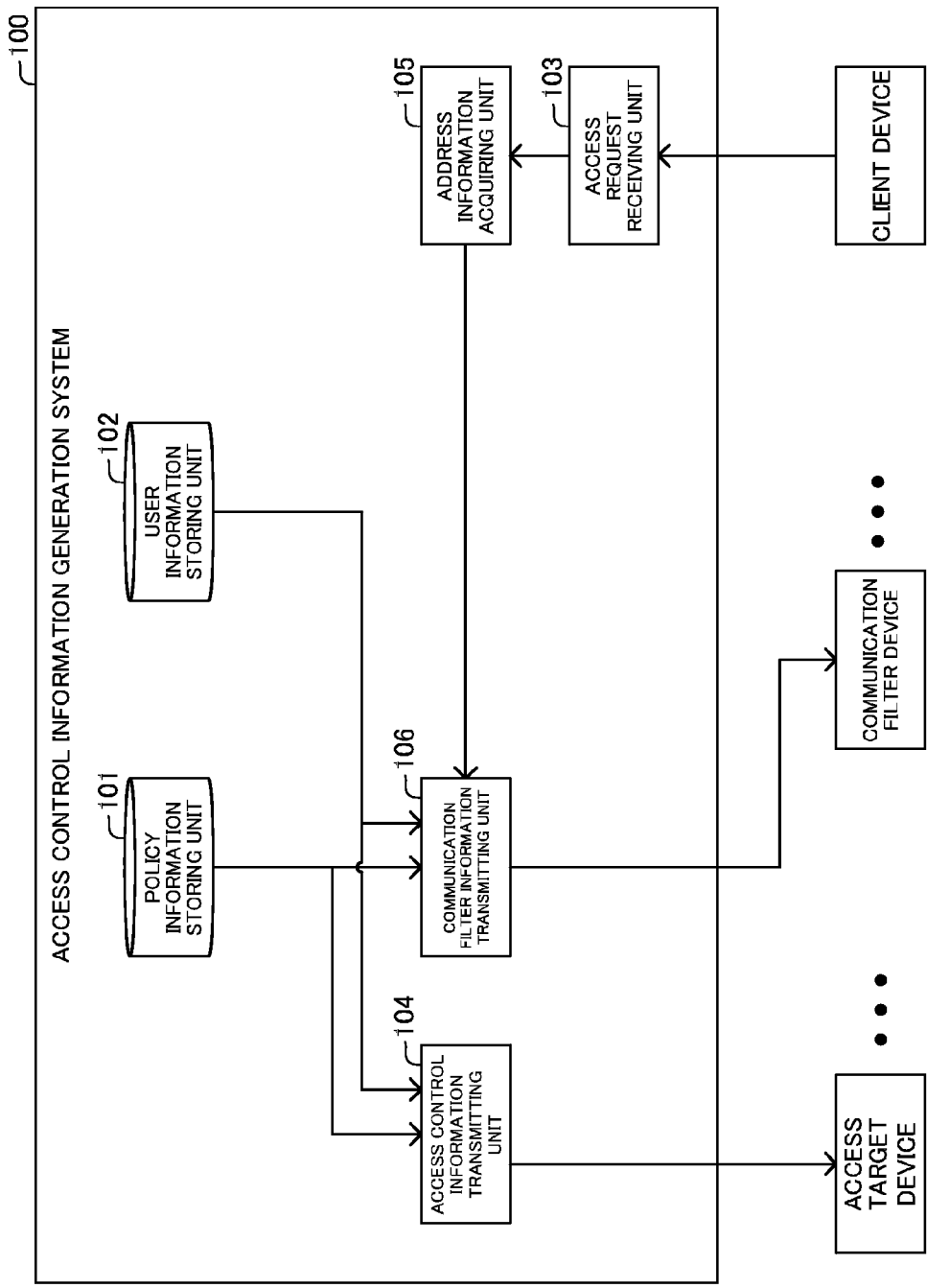

ACCESS CONTROL INFORMATION GENERATING SYSTEM

CROSS REFERENCE TO RELATED APPLICATIONS

This is a National Stage of International Application No. PCT/JP2011/004663 filed Aug. 23, 2011, claiming priority based on Japanese Patent Application No. 2010-214748 filed Sep. 27, 2010, the contents of all of which are incorporated herein by reference in their entirety.

TECHNICAL FIELD

The present invention relates to an access control information generation system that generates information for controlling access from a client device to a resource.

BACKGROUND ART

An access control system that controls access from a client device to an access target resource as a resource to be the target of access is known. For example, an access target resource is a file, a virtual machine, database, and/or an application program.

An access target device having an access target resource controls access from a client device to the access target resource based on access control information that includes information for specifying the access target resource, information representing the type of access, and so on (i.e., executes access control). In general, access control information is information having a different format for each access target resource.

Therefore, in a case that access control is executed on a plurality of access target resources, a user (e.g., a manager of an access control system) needs to properly set access control information for each of the access target resources. That is to say, the setup of access control information is cumbersome.

For the purpose of dealing with such a problem, an access control information generation system disclosed in Non-Patent Document 1 generates access control information for each of a plurality of access target resources based on policy information. Then, the access control information generation system transmits the generated access control information to an access target device associated with the access control information. The access target device receives the access control information, and executes access control based on the received access control information.

Consequently, the user can properly set access control information for each of a plurality of access target resources different from each other, by only setting policy information.
[Non-Patent Document 1] OGAWA Ryuichi, et al., "Authority Management Infrastructure for the Virtual Server Integrated Environment" NEC Technical Journal by NEC Corporation, Vol. 63, No. 2, pp. 129-133, April 2010

On a communication path from a client device to an access target device, a communication filter device that relays communication between the access target device and the client device is often installed. In this case, when the communication filter device does not permit communication by an address (e.g., an IP (Internet Protocol) address) for specifying the client device in a communication network, the client device cannot access the access target resource.

Further, an IP address is often assigned to the client device dynamically. For example, an IP address is often assigned to the client device so as to be different every time the client device is connected to the communication network.

Thus, an access control information generation system cannot acquire an IP address assigned to the client device until a time point that the client device accesses an access target resource. Therefore, it is impossible to set communication filter information for permitting communication by the client device in the communication filter device, at a time point earlier than the time point that the client device accesses the access target resource Consequently, in an access control system to which the abovementioned access control information generation system is applied, even when the access target device permits communication by the client device, communication between the client device and the access target device is interrupted (forbidden) by the communication filter device, and consequently, there is a fear that the client device cannot access the access target resource.

That is to say, in an access control system to which the abovementioned access control information generation system is applied, there is a fear that the client device cannot smoothly perform access permitted by the access target device.

SUMMARY

Accordingly, an object of the present invention is to provide an access control information generation system capable of solving the aforementioned problem, "there is a case that the client device cannot smoothly perform access permitted by the access target device."

In order to achieve the object, an access control information generation system as an exemplary embodiment of the present invention includes:

a policy information storing means for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information storing means for storing user identification information for identifying a user and role identification information for identifying a role assigned to the user in association with each other;

an access request receiving means for receiving an access request including user identification information for identifying a user of a client device from the client device;

an access control information transmitting means for generating access control information representing permission for a user identified by user identification information stored in association with the role identification information included in the stored policy information to perform access of the type represented by the action information included in the policy information, and transmitting the generated access control information to the access target device having the access target resource included in the resource group identified by the resource group identification information included in the policy information;

an address information acquiring means for acquiring address information representing an address for specifying a transmission source of the received access request in a communication network; and a communication filter information transmitting means for generating communication filter information representing permission for at least one of communication that the address represented by the acquired address information is a transmission source and communication that the address is a transmission destination, and transmitting the generated communication filter information to a communication filter device relaying communication between the client device and the access target device having an access target resource included in a resource group identified by resource group identification information included in policy information including role identification information stored in association with the user identification information included in the received access request, among the stored policy information.

Further, an access control information generation method as another exemplary embodiment of the present invention is a method including:

generating access control information representing permission for a user identified by user identification information stored in a storage device in association with role identification information included in policy information stored in the storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other, and the storage device also storing user identification information for identifying a user and role identification information for identifying a role assigned to the user in association with each other; and transmitting the generated access control information to the access target device having the access target resource included in the resource group identified by the resource group identification information included in the policy information;

receiving an access request including user identification information for identifying a user of a client device from the client device;

acquiring address information representing an address for specifying a transmission source of the received access request in a communication network; and generating communication filter information representing permission for at least one of communication that the address represented by the acquired address information is a transmission source and communication that the address is a transmission destination, and transmitting the generated communication filter information to a communication filter device relaying communication between the client device and the access target device having an access target resource included in a resource group identified by resource group identification information included in policy information including role identification information stored in the storage device in association with the user identification information included in the received access request, among the policy information stored in the storage device.

Further, an access control information generation device as another exemplary embodiment of the present invention includes:

a policy information storing means for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information receiving means for receiving user identification information for identifying a user of a client device and address information representing an address for specifying the client device in a communication network;

an access control information transmitting means for generating access control information representing permission for a user identified by user identification information associated with the role identification information included in the stored policy information to perform access of the type represented by the action information included in the policy information, and transmitting the generated access control information to the access target device having the access target resource included in the resource group identified by the resource group identification information included in the policy information; and a communication filter information transmitting means for generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the stored policy information.

Further, an access control information generation method as another exemplary embodiment of the present invention is a method including:

generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;

receiving user identification information for identifying a user of a client device and address information representing an address for specifying the client device in a communication network; and generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device.

Further, a program as another exemplary embodiment of the present invention is a program comprising instructions for causing an information processing device to realize:

an access control information transmitting means for generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;

a user information receiving means for receiving user identification information for identifying a user of a client device and address information representing an address for specifying the client device in a communication network; and a communication filter information transmitting means for generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device.

With the configurations as described above, the present invention can enable the client device to smoothly perform access permitted by the access target device.

BRIEF DESCRIPTION OF DRAWINGS

FIG. 2 is a block diagram showing the outline of a function of the access control system according to the first exemplary embodiment of the present invention;

FIG. 3 is a table that is stored by a user information management server in the first exemplary embodiment of the present invention and that shows user identification information, role identification information, and password information;

FIG. 4 is a table that is stored by an access control information generation server in the first exemplary embodiment of the present invention and that shows role identification information, resource group identification information, and action information;

FIG. 5 is a table that is stored by the access control information generation server in the first exemplary embodiment of the present invention and that shows resource group identification information, access target device identification information, and communication filter device identification information;

FIG. 6 is a sequence diagram showing the outline of an operation of the access control system according to the first exemplary embodiment of the present invention;

FIG. 7 is a sequence diagram showing the outline of an operation of the access control system according to the first exemplary embodiment of the present invention;

FIG. 8 is a sequence diagram showing the outline of an operation of an access control system according to a second exemplary embodiment of the present invention;

FIG. 9 is a block diagram showing the outline of a function of an access control system according to a third exemplary embodiment of the present invention;

FIG. 12 is a block diagram showing the outline of a function of an access control information generation system according to a fourth exemplary embodiment of the present invention.

EXEMPLARY EMBODIMENTS

Below, respective exemplary embodiments of an access control information generation system, an access control information generation method, an access control information generation device and a program according to the present invention will be described with reference to FIGS. 1 to 12.

First Exemplary Embodiment

Configuration

Figure 1:
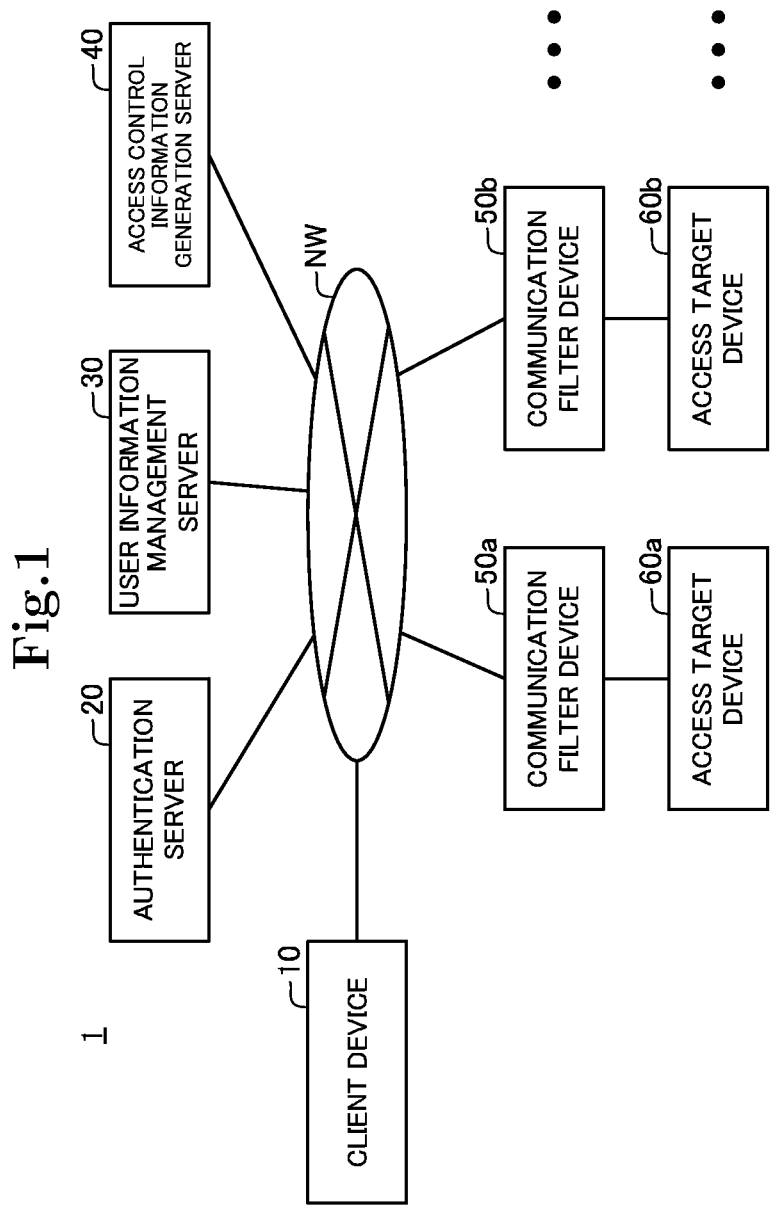
FIG. 1 is a diagram showing a schematic configuration of an access control system according to a first exemplary embodiment of the present invention.

As shown in FIG. 1, an access control system 1 according to a first exemplary embodiment includes a client device 10, an authentication server 20, a user information management server 30, an access control information generation server (an access control information generation device) 40, a plurality of communication filter devices 50a, 50b, etc., and a plurality of access target devices 60a, 60b, etc.

The authentication server 20, the user information management server 30 and the access control information generation server 40 configure an access control information generation system. The access control information generation server 40 may be configured by a plurality of servers. Moreover, the authentication server 20 and the access control information generation server 40 may be configured by one server. Moreover, the authentication server 20, the user information management server 30 and the access control information generation server 40 may be configured by one server.

The client device 10, the authentication server 20, the user information management server 30, the access control information generation server 40, and the plurality of communication filter devices 50a, 50b, etc. are connected so as to be capable of communicating with each other via a communication network NW configuring an IP (Internet Protocol) network. The access target device 60a is connected to the communication network NW via (through) the communication filter device 50a. Likewise, the access target devices 60b, etc. are connected to the communication network NW via the communication filter devices 50b, etc., respectively.

The client device 10 is an information processing device. The client device 10 may be a personal computer, a mobile phone terminal, a PHS (Personal Handyphone System), a PDA (Personal Data Assistance, Personal Digital Assistant), a car navigation terminal, a game terminal, or the like.

The client device 10 is provided with a central processing unit (CPU), a storage device (a memory and a hard disk drive (HDD)), an input device (e.g., a keyboard, a mouse, and so on), and an output device (e.g., a display, and so on), which are not shown in the drawings.

The client device 10 is configured to realize a function described later by execution of a program stored in the storage device by the CPU.

Each of the authentication server 20, the user information management server 30 and the access control information generation server 40 (each of the servers 20 to 40) is an information processing device. As the client device 10 is, each of the servers 20 to 40 is provided with a CPU and a storage device, which are not shown in the drawings. As the client device 10 is, each of the servers 20 to 40 is configured to realize a function described later by execution of a program stored in the storage device by the CPU.

Each of the communication filter devices 50a, 50b, etc. is an information processing device that functions as a firewall. As the client device 10 is, each of the communication filter devices 50a, 50b, etc. is provided with a CPU and a storage device, which are not shown in the drawings. As the client device 10 is, each of the communication filter devices 50a, 50b, etc. is configured to realize a function described later by execution of a program stored in the storage device by the CPU.

Each of the access target devices 60a, 60b, etc. is a storage device, an information processing device, or the like. As the client device 10 is, each of the access target devices 60a, 60b, etc. is provided with a CPU and a storage device, which are not shown in the drawings. As the client device 10 is, each of the access target devices 60a, 60b, etc. is configured to realize a function described later by execution of a program stored in the storage device by the CPU.

(Function)

FIG. 2 is a block diagram showing a function of the access control system 1 configured as described above.

The client device 10 accepts user identification information and password information inputted by the user. The user identification information is information (in this exemplary embodiment, information representing a string) for identifying the user. The password information is information (in this exemplary embodiment, information representing a string) for showing that the user is a valid user.

The client device 10 transmits an access request including the accepted user identification information and password information, to the authentication server 20. The access request is information representing a request for access to an access target resource that is a resource to be the target of the access.

For example, the access target resource is a file, a virtual machine, database, and/or an application program.

In a case that the access target resource is a file, the access is equivalent to retrieving data from the file, writing data into the file, executing the file, and so on. Moreover, in a case that the access target resource is a virtual machine, the access is equivalent to starting the virtual machine, stopping the virtual machine, restarting the virtual machine, and so on.

Moreover, in a case that the access target resource is database, the access is equivalent to inserting a record into a specific table contained in the database, deleting a record from a specific table contained in the database, updating a record of a specific table contained in the database, and so on. Moreover, in a case that the access target resource is an application program, the access is equivalent to executing the application program, finishing the application program, and so on.

Further, the client device 10 accepts an access instruction inputted by the user. The access instruction includes user identification information for identifying the user of the client device 10, resource identification information for identifying an access target resource, and action information representing the type of access to the access target resource. The client device 10 transmits the accepted access instruction to the access target device 60a or 60b or etc.

A function of the user information management server 30 includes a user information storing unit (a user information storing means) 31.

As shown in FIG. 3, the user information storing unit 31 stores user identification information for identifying a user, role identification information for identifying a role assigned to the user and password information in an associated manner. The user information storing unit 31 may store one user identification information and a plurality of role identification information in an associated manner.

When receiving a transmission request from the authentication server 20 or the access control information generation server 40, the user information management server 30 transmits the user identification information, role identification information and password information that are stored therein, to a server (i.e., the authentication server 20 or the access control information generation server 40) having transmitted the transmission request.

A function of the authentication server 20 includes an access request receiving unit (an access request receiving means) 21, an address information acquiring unit (an address information acquiring means) 22, an authentication processing unit (an authentication processing means) 23, and a user information transmitting unit 24.

The access request receiving unit 21 receives an access request transmitted by the client device 10.

The address information acquiring unit 22 acquires address information representing an address (in this exemplary embodiment, an IP address) for specifying a transmission source of an access request received by the access request receiving unit 21 in a communication network (in this exemplary embodiment, an IP network). To be specific, the address information acquiring unit 22 acquires the address information based on information included in data (in this exemplary embodiment, a packet) as the access request.

The authentication processing unit 23 accepts user identification information and password information that are included in an access request received by the access request receiving unit 21. Then, the authentication processing unit 23 executes an authentication process of judging whether a user identified by the user identification information is a valid user, based on the accepted user identification information and password information.

To be specific, the authentication processing unit 23 transmits a transmission request to the user information management server 30, and thereby receives the user identification information and the password information from the user information management server 30. Thus, the authentication processing unit 23 judges whether the same user identification information and password information as the accepted user identification information and password information are stored in the user information storing unit 31 in the associated manner.

The authentication processing unit 23 may be configured to previously transmit a transmission request to the user information management server 30 to thereby receive a combination of user identification information and password information from the user information management server 30 and previously store the combination of user identification information and password information.

In a case that the same user identification information and password information as the accepted user identification information and password information are stored in the user information storing unit 31 in the associated manner, the authentication processing unit 23 judges that the user identified by the user identification information is a valid user (the authentication process has succeeded). On the other hand, in a case that the same user identification information and password information as the accepted user identification information and password information are not stored in the user information storing unit 31 in the associated manner, the authentication processing unit 23 judges that the user identified by the user identification information is not a valid user (the authentication process has failed).

In a case that the authentication processing unit 23 judges that the authentication process has succeeded, the user information transmitting unit 24 transmits the user identification information included in the access request received by the access request receiving unit 21 and the address information acquired by the address information acquiring unit 22, to the access control information generation server 40.

A function of the access control information generation server 40 includes a policy information storing unit (a policy information storing means) 41, a resource device association information storing unit (a resource device association information storing means) 42, an access control information transmitting unit (an access control information transmitting means) 43, a user information receiving unit 44, and a communication filter information transmitting unit (a communication filter information transmitting means) 45.

The policy information storing unit 41 stores policy information. The policy information is information in which role identification information, resource group identification information and action information are associated with each other as shown in FIG. 4. The role identification information is information for identifying a role assigned to the user. The resource group identification information is information for identifying a resource group including at least one access target resource that is owned by the access target device and that is a resource to be the target of access. The action information is information representing the type of access to the access target resource.

As shown in FIG. 5, the resource device association information storing unit 42 stores resource group identification information, communication filter device identification information and access target device identification information in the associated manner. The access target device identification information is information for identifying the access target device 60*a* or 60*b* or etc. having an access target resource included in a resource group identified by resource group identification information associated with the access target device identification information.

The communication filter device identification information is information for identifying the communication filter device 50*a* or 50*b* or etc. relaying communication between the client device 10 and the access target device 60*a* or 60*b* or etc. having an access target resource included in a resource group identified by resource group identification information associated with the communication filter device identification information.

That is to say, in this exemplary embodiment, communication filter device identification information stored in association with certain access target device identification information is information for identifying the communication filter device 50*a* or 50*b* or etc. placed immediately before the access target device 60*a* or 60*b* or etc. identified by the access target device identification information, when seen from the client device 10. In other words, a physical connection relation is reflected on association between the communication filter device identification information and the access target device identification information.

The access control information transmitting unit 43 acquires all of the combinations of user identification information and role identification information stored in the user information storing unit 31. To be specific, the access control information transmitting unit 43 transmits a transmission request to the user information management server 30, and thereby receives (i.e., acquires) the combinations of user identification information and role identification information from the user information management server 30.

Further, the access control information transmitting unit 43 executes an access control information transmission process on each of the policy information stored in the policy information storing unit 41. The access control information transmission process includes a process of acquiring user identification information associated with role identification information included in policy information to be the target of the access control information transmission process.

Further, the access control information transmission process includes a process of generating access control information representing permission for a user identified by the acquired user identification information to perform access of a type represented by action information included in policy information to be the target of the access control information transmission process.

Besides, the access control information transmission process includes a process of transmitting the generated access control information to the access target device 60*a* or 60*b* or etc. identified by access target device identification information stored in the resource device association information storing unit 42 in association with resource group identification information included in policy information to be the target of the access control information transmission process.

That is to say, the access control information transmitting unit 43 is configured to transmit the generated access control information to the access target device 60*a* or 60*b* or etc. having an access target resource included in a resource group identified by resource group identification information included in policy information to be the target of the access control information transmission process.

The user information receiving unit 44 receives user information and address information transmitted by the authentication server 20.

The communication filter information transmitting unit 45 generates communication filter information representing permission for at least one of communication in which an address represented by address information received by the user information receiving unit 44 is a transmission source and communication in which the address is a transmission destination.

In this exemplary embodiment, the communication filter information transmitting unit generates communication filter information representing permission for both communication in which an address represented by address information received by the user information receiving unit 44 is a transmission source and communication in which the address is a transmission destination. The communication filter information transmitting unit 45 may be configured to generate communication filter information representing permission for only one of communication in which an address represented by address information received by the user information receiving unit 44 is a transmission source and communication in which the address is a transmission destination.

Furthermore, the communication filter information transmitting unit 45 specifies policy information including role identification information stored in the user information storing unit 31 in association with user identification information received by the user information receiving unit 44, from among the policy information stored in the policy information storing unit 41.

Besides, the communication filter information transmitting unit 45 transmits the generated communication filter information to the communication filter device 50*a* or 50*b* or etc. identified by communication filter device identification information stored in the resource device association information storing unit 42 in association with resource group identification information included in the specified policy information.

That is to say, the communication filter information transmitting unit 45 is configured to transmit the generated communication filter information, to the communication filter device 50*a* or 50*b* or etc. relaying communication between the client device 10 and the access target device 60*a* or 60*b* or etc. having an access target resource included in a resource group identified by the resource group identification information included in the specified policy information.

Thus, the communication filter information transmitting unit 45 is configured to generate communication filter information when user identification information and address information are received by the user information receiving unit 44. That is to say, the communication filter information transmitting unit 45 is configured to generate communication filter information when the user of the client device 10 is judged to be a valid user in the authentication process by the authentication server 20.

The access target device 60*a* receives access control information from the access control information generation server 40. The access target device 60*a* causes the storage device to store the received access control information.

Further, the access target device 60*a* receives an access instruction transmitted by the client device 10. The access instruction includes user identification information for identifying the user of the client device 10, resource identification information for identifying an access target resource, and action information representing the type of access to the access target resource.

When receiving the access instruction, the access target device 60*a* judges whether the access to the access target resource based on the access instruction (i.e., access of the type represented by the action information included in the access instruction, to the access target resource identified by the resource identification information included in the access instruction, by the user identified by the user identification information included in the access instruction) is permitted or not.

To be specific, the access target device 60*a* judges whether the access to the access target resource in accordance with the access instruction is permitted or not, based on the access control information stored therein.

Then, in the case of judging that the access to the access target resource in accordance with the access instruction is permitted, the access target device 60*a* executes a process for realizing the access to the access target resource.

For example, in a case that the access to the access target resource is equivalent to writing data into a file, the access target device 60*a* receives data from the client device 10, and writes the received data into a file that is the access target resource. Likewise, in a case that the access to the access target resource is equivalent to retrieving data from a file, the access target device 60*a* retrieves data from a file that is the access target resource, and transmits the retrieved data to the client device 10.

Each of the access target devices 60*b* etc. has the same function as the access target device 60*a*.

The communication filter device 50*a* receives communication filter information from the access control information generation server 40. The communication filter device 50*a* causes the storage device to store the received communication filter information.

Further, the communication filter device 50*a* relays communication between the access target device 60*a* and the client device 10. At this moment, when receiving data from the access target device 60*a* or the client device 10, the communication filter device 50*a* judges whether to permit transmission (transfer) of the received data based on the communication filter information stored therein.

In the case of judging to permit transfer of the received data, the communication filter device 50*a* relays the communication by transferring the received data. On the other hand, in the case of judging not to permit transfer of the received data, the communication filter device 50*a* does not transfer the received data (forbids transfer).

For example, in a case that the communication filter device 50*a* receives data in which an address of the client device 10 (an address assigned to the client device 10) is set as the address of a transmission source and the address of the access target device 60*a* is set as the address of a transmission destination from the client device 10, when communication filter information representing permission for communication in which the address of the client device 10 is the transmission source is stored in the storage device, the communication filter device 50*a* transmits the received data to the access target device 60*a*.

In the same manner, in a case that the communication filter device 50*a* receives data in which the address of the access target device 60*a* is set as the address of a transmission source and the address of the client device 10 is set as the address of a transmission destination, when communication filter information representing permission for communication in which the address of the client device 10 is the transmission destination is stored in the storage device, the communication filter device 50*a* transmits the received data to the client device 10.

The communication filter device 50*a* may be configured to, after a preset effective period passes from a time point of storage of communication filter information into the storage device, delete the communication filter information.

Further, each of the communication filter devices 50*b*, etc. has the same function as the communication filter device 50*a*.

(Operation)

Next, the operation of the abovementioned access control system 1 will be described with reference to sequence diagrams shown in FIGS. 6 and 7. In this exemplary embodiment, the process and operation by the access control system 1 on access to an access target resource owned by the access target device 60*a* will be mainly described. The process executed by the access control system 1 and the operation of the access control system 1 relating to access to an access target resource owned by the access target device 60*b*, etc. will also be described in the same way.

First, the access control information generation server 40 generates access control information (step S101 in FIG. 6). To be specific, the access control information generation server 40 generates access control information based on user identification information and role identification information stored by the user information storing unit 31 and policy information stored by the policy information storing unit 41.

The access control information generation server 40 may be configured to generate access control information based on user identification information and role identification information stored by the user information storing unit 31, policy information stored by the policy information storing unit 41, and resource group identification information and access target device identification information stored by the resource device association information storing unit 42.

Next, the access control information generation server 40 transmits the generated access control information to the access target device 60*a* (step S102 in FIG. 6). To be specific, the access control information generation server 40 specifies a transmission destination of the generated access control information, based on the access target device identification information and resource group identification information stored by the resource device association information storing unit 42 and the policy information used as the base of generation of the access control information. Then, the access control information generation server 40 transmits the generated access control information to an access target device (in this exemplary embodiment, the access target device 60*a*) having been specified as the transmission destination.

Consequently, the access target device 60*a* receives the access control information from the access control information generation server 40. Then, the access target device 60*a* executes an access control setting process based on the received access control information (step S103 in FIG. 6). To be specific, the access target device 60*a* causes the storage device to store the received access control information (i.e., perform setting of control of access to the access target resource).

After that, the client device 10 accepts user identification information and password information inputted by the user. Then, the client device 10 transmits an access request including the accepted user identification information and password information to the authentication server 20 (step S201 in FIG. 7).

Consequently, the authentication server 20 receives the access request from the client device 10. Then, the authentication server 20 executes an authentication process of judging, based on the user identification information and password information included in the received access request and the user identification information and password information stored by the user information storing unit 31, whether the user identified by the user identification information is a valid user (step S202 in FIG. 7).

Assuming the authentication server 20 has judged the user identified by the user identification information to be a valid user (the authentication process has succeeded), the description will be continued. In a case that the authentication server 20 has not judged the identified by the user identification information to be a valid user (the authentication process has failed), the access control system 1 does not execute processes at steps S203 to S207 of FIG. 7 described later.

Next, the authentication server 20 acquires address information representing an IP address that is a transmission source of the received access request (step S203 in FIG. 7). Then, the authentication server 20 transmits the acquired address information and the user identification information included in the received access request, to the access control information generation server 40 (step S204 in FIG. 7).

Consequently, the access control information generation server 40 receives the user identification information and the address information from the authentication server 20. Next, the access control information generation server 40 generates communication filter information (step S205 in FIG. 7). To be specific, the access control information generation server 40 generates communication filter information based on the received address information.

Next, the access control information generation server 40 transmits the generated communication filter information to the communication filter device 50*a* (step S206 in FIG. 7).

To be specific, the access control information generation server 40 specifies a transmission destination of the generated communication filter information, based on the communication filter device identification information and resource group identification information stored by the resource device association information storing unit 42, the policy information stored by the policy information storing unit 41, and the user identification information and role identification information stored by the user information storing unit 31. That is to say, the access control system 1 specifies policy information including role identification information associated with the user identification information included in the access request, and further specifies communication filter device identification information associated with resource group identification information included in the policy information. Then, the access control information generation server 40 transmits the generated communication filter information to a communication filter device (in this exemplary embodiment, the communication filter device 50*a*) that is the specified transmission destination.

Consequently, the communication filter device 50*a* receives the communication filter information from the access control information generation server 40. Then, the communication filter device 50*a* executes a communication filter setting process based on the received communication filter information (step S207 in FIG. 7). To be specific, the communication filter device 50*a* causes the storage device to store the received communication filter information (i.e., performs setting of control of communication between the access target device 60*a* and the client device 10).

After that, the client device 10 accepts an access instruction inputted by the user. The access instruction includes the user identification information for identifying the user of the client device 10, resource identification information for identifying an access target resource, and action information representing a type of access to the access target resource.

The client device 10 transmits the accepted access instruction to the access target device 60*a* via (through) the communication filter device 50*a*. At this moment, the communication filter device 50*a* stores communication filter information representing permission for both the communication that the address of the client device 10 is a transmission source and the communication that the address of the client device is a transmission destination, in the storage device. Therefore, the communication filter device 50*a* relays communication between the client device 10 and the access target device 60*a*.

Consequently, the access target device 60*a* receives the access instruction from the client device 10. A case that the access target device 60*a* stores, in the storage device, access control information representing permission for the user identified by the user identification information included in the access instruction to perform access of the type represented by the action information included in the access instruction will be assumed. In this case, the access target device 60*a* executes a process for realizing access to the access target resource identified by the resource identification information included in the access instruction (step S208 in FIG. 7).

Thus, the client device 10 can access the access target resource owned by the access target device 60*a*.

As described above, in the access control system 1 according to the first exemplary embodiment of the present invention, the access control information generation server 40 generates access control information based on policy information, and transmits the generated access control information to the access target device 60a or 60b or etc. Consequently, the access target device 60a or 60b or etc. permits the user to access an access target resource based on the received access control information.

Further, the access control information generation server 40 generates communication filter information representing permission for communication that the address of the client device 10 having transmitted an access request is set as a transmission source or a transmission destination. Furthermore, the access control information generation server 40 transmits the communication filter information to the communication filter device 50a or 50b or etc. relaying communication between the client device 10 and the access target device 60a or 60b or etc. having an access target resource associated in policy information with a role assigned to the user having transmitted the access request. Consequently, the communication device 50a or 50b or etc. permits communication by the client device 10.

As a result, it is possible to cause the client device to smoothly perform access permitted by the access target device 60a or 60 or etc.

Further, in the access control system 1 according to the first exemplary embodiment, the access control information generation server 40 generates communication filter information when the user is judged to be a valid user in the authentication process by the authentication server 20.

According to this, only when the user of the client device 10 is judged to be a valid user, it is possible to cause the client device 10 to access the access target resource. In other words, when the user of the client device 10 is not judged to be a valid user, it is possible to forbid access to the access target resource by the client device 10.

In the access control system 1 according to a modified example of the first exemplary embodiment, the access request may include device unique information that is information unique to the client device 10 (e.g., MAC (Media Access Control) address). In this case, the authentication server 20 executes the authentication process based on the device unique information.

Further, the access control system 1 according to another modified example of the first exemplary embodiment may be configured so that the client device 10 transmits the access instruction to the access target devices, 60a or 60b or the like via the authentication server 20 and the communication filter device 50a or 50b or etc. in order.

Second Exemplary Embodiment

Next, an access control system according to a second exemplary embodiment of the present invention will be described. The access control system according to the second exemplary embodiment is different from the access control system according to the first exemplary embodiment in generating access control information representing permission for access by the user relating to an authentication process in a case that the authentication process is successful. Therefore, a description will be made below focusing on the different point.

The access control information transmitting unit 43 in the second exemplary embodiment executes an access control information transmission process on each policy information including role identification information stored in the user information storing unit 31 in association with user identification information received by the user information receiving unit 44, among the policy information stored in the policy information storing unit 41.

The access control information transmission process includes a process of generating access control information representing permission for the user identified by the user identification information received by the user information receiving unit 44 to perform access of a type represented by action information included in policy information that is the target of the access control information transmission process.

In addition, the access control information transmission process includes a process of transmitting the generated access control information to the access target device 60a or 60b or etc. identified by access target device identification information stored by the resource device association information storing unit 42 in association with resource group identification information included in policy information that is the target of the access control information transmission process.

Next, the operation of the access control system 1 according to the second exemplary embodiment will be described.

The access control system 1 according to the second exemplary embodiment executes, instead of the processes shown in FIGS. 6 and 7, a process in which steps S301 to S303 shown in FIG. 8 are inserted between steps S204 and S205 in FIG. 7.

To be specific, upon reception of user identification information and address information from the authentication server 20, the access control information generation server 40 generates access control information (step S301 in FIG. 8). To be more specific, the access control information generation server 40 generates access control information based on the received user identification information, user identification information and role identification information stored in the user information storing unit 31, and policy information stored in the policy information storing unit 41.

Next, the access control information generation server 40 transmits the generated access control information to the access target device 60a (step S302 in FIG. 8).

Consequently, the access target device 60a receives the access control information from the access control information generation server 40. Then, the access target device 60a executes an access control setting process based on the received access control information (step S303 in FIG. 8).

Thus, the access control system 1 according to the second exemplary embodiment, when the user is judged to be a valid user in the authentication process by the authentication server 20, sets access control information representing permission for access by the user, to the access target device 60a or 60b or etc.

Accordingly, only when the user of the client device 10 is judged to be a valid user, it is possible to cause the client device 10 to access the access target resource. In other words, when the user of the client device 10 is not judged to be a valid user, it is possible to forbid access to the access target resource by the client device 10.

Further, the access control system 1 according to the second exemplary embodiment can also produce the same actions and effects as the access control system 1 according to the first exemplary embodiment.

Third Exemplary Embodiment

Next, an access control system according to a third exemplary embodiment of the present invention will be described. The access control system according to the third exemplary embodiment is different from the access control system according to the first exemplary embodiment in transmitting notice representing completion of execution of the communication filter setting process to the client device 10 at the time of the completion. Therefore, a description will be made below focusing on the different point.

A function of the access target device 60a in the third exemplary embodiment includes a function of transmitting access control setting completion notice to the access control information generation server 40 when execution of an access control setting process is completed. The access control setting completion notice is information representing that setting of control of access to the access target resource based on the access control information is completed. Each of the access target devices 60b etc. also has the same function as the access target device 60a.

A function of the communication filter device 50a in the third exemplary embodiment includes a function of transmitting communication filter setting completion notice to the access control information generation server 40 when execution of the communication filter setting process is completed. The communication filter setting completion notice is information representing that setting of control of communication between the access target device 60a and the client device 10 based on the communication filter information is completed. Each of the communication filter devices 50b etc. also has the same function as the communication filter device 50a.

As shown in FIG. 9, a function of the access control information generation server 40 in the third exemplary embodiment includes an access permission notice transmitting unit (an access control setting completion notice transmitting means, and a communication filter setting completion notice transmitting means) 46, in addition to the function of the access control information generation server 40 in the first exemplary embodiment.

When receiving access control setting completion notice from the access target device 60a or 60b or etc., and also receiving communication filter setting completion notice from the communication filter device 50a or 50b or etc., the access permission notice transmitting unit 46 transmits access permission notice to the authentication server 20. The access permission notice is information representing that access to an access target resource is permitted (access to an access target resource is available). In this exemplary embodiment, the access permission notice composes access control setting completion notice and communication filter setting completion notice.

As shown in FIG. 9, a function of the authentication server 20 in the third exemplary embodiment includes an access permission notice transferring unit 25 in addition to the function of the authentication server 20 in the first exemplary embodiment.

The access permission notice transferring unit 25 receives access permission notice from the access control information generation server 40. The access permission notice transferring unit 25 transmits (transfers) the received access permission notice to the client device 10 having transmitted the access request.

Further, the client device 10 in the third exemplary embodiment is configured to transmit the access instruction when receiving the access permission notice.

Next, the operation of the access control system 1 according to the third exemplary embodiment will be described.

Figure 10:
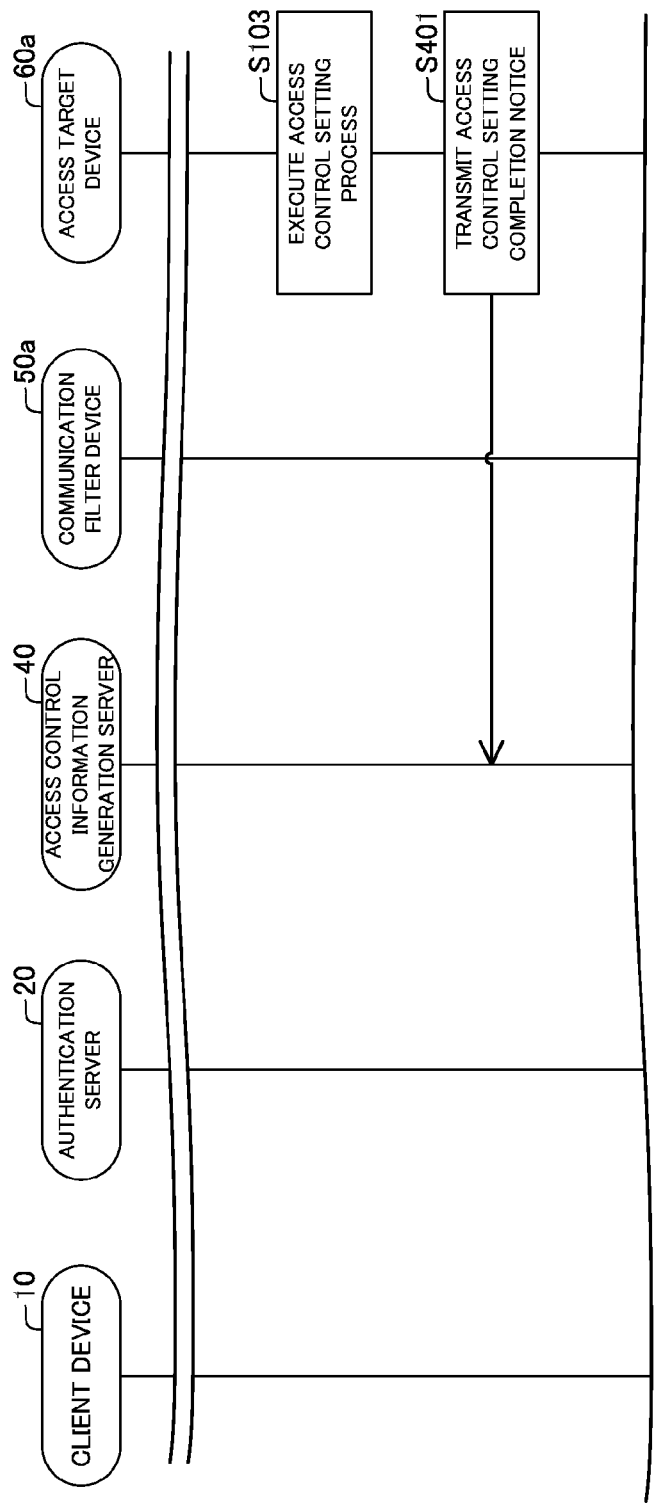
FIG. 10 is a sequence diagram showing the outline of an operation of the access control system according to the third exemplary embodiment of the present invention.

The access control system 1 according to the third exemplary embodiment executes, instead of the process shown in FIG. 6, a process in which step S401 shown in FIG. 10 is added after step S103 of FIG. 6.

To be specific, when execution of the access control setting process is completed, the access target device 60a transmits access control setting completion notice representing the completion, to the access control information generation server 40 (step S401 in FIG. 10). Consequently, the access control information generation server 40 receives the access control setting completion notice from the access target device 60a.

Figure 11:
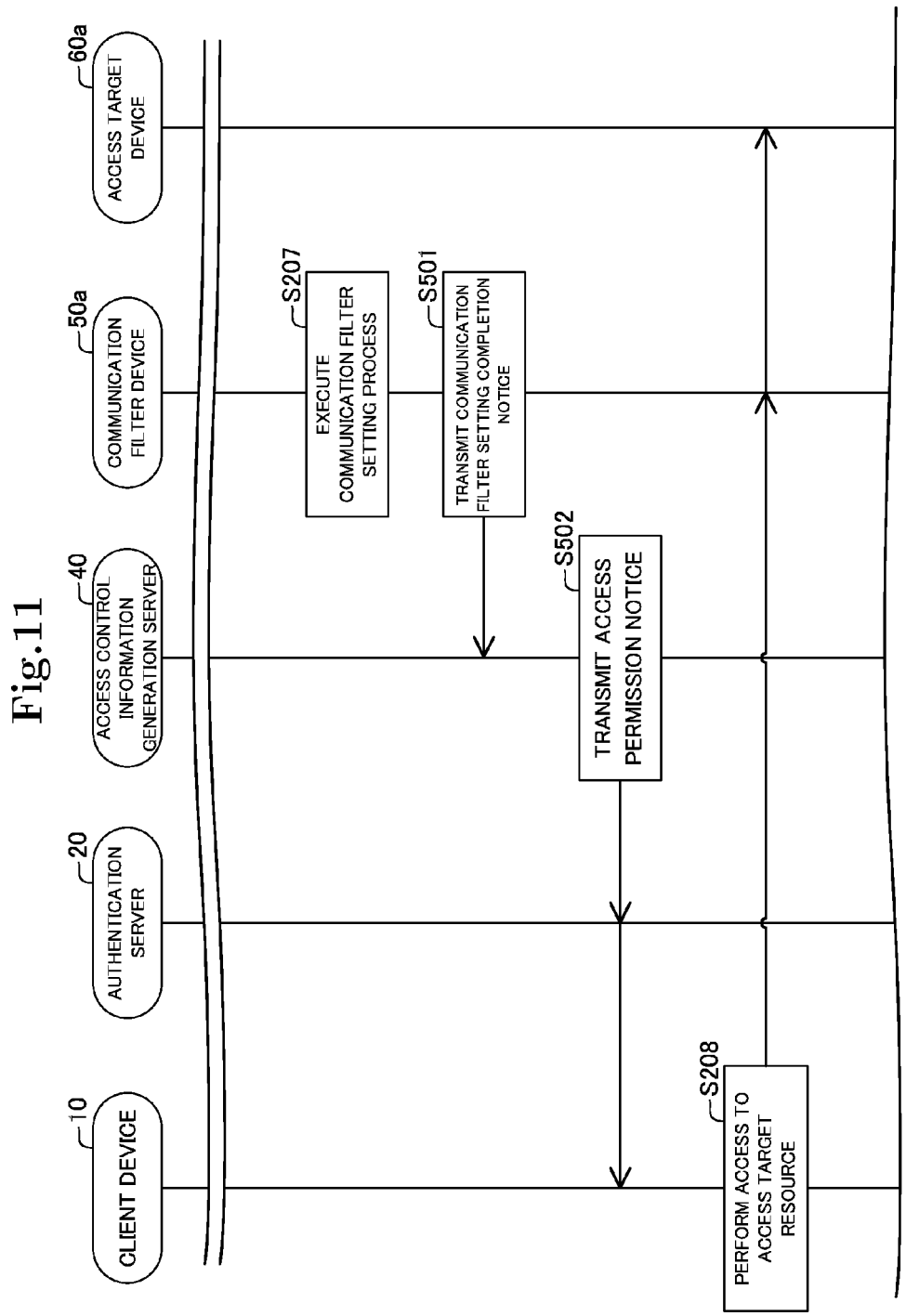
FIG. 11 is a sequence diagram showing the outline of an operation of the access control system according to the third exemplary embodiment of the present invention.

Further, the access control system 1 according to the third exemplary embodiment executes, instead of the process shown in FIG. 7, a process in which steps S501 and S02 shown in FIG. 11 are inserted between steps S207 and S208 of FIG. 7.

To be specific, when execution of the communication filter setting process is completed, the communication filter device 50a transmits communication filter setting completion notice representing the completion, to the access control information generation server 40 (step S501 in FIG. 11). Consequently, the access control information generation server 40 receives the communication filter setting completion notice from the communication filter device 50a.

Then, because having received both the access control setting completion notice and the communication filter setting completion notice, the access control information generation server 40 transmits an access permission notice to the authentication server 20 (step S502 in FIG. 11). Consequently, the authentication server 20 receives the access permission notice from the access control information generation server 40, and transmits the received access permission notice to the client device 10.

Consequently, the client device 10 receives the access permission notice from the authentication server 20. Then, the client device 10 transmits an access instruction to the access target device 60a via the communication filter device 50a (step S208 in FIG. 11).

Thus, according to the access control system 1 of the third exemplary embodiment, it is possible to notice the client device 10 that setting of control of access to an access target resource is completed. Moreover, it is possible to notice the client device 10 that setting of control of communication between the access target device 60a or 60b or etc. and the client device 10 is completed. Consequently, the client device 10 can access the access target resource more smoothly.

Further, the access control system 1 according to the third exemplary embodiment can produce the same actions and effects as the access control system 1 according to the first exemplary embodiment.

The authentication server 20 in a modified example of the third exemplary embodiment may be configured to, when the user is judged to be a valid user in the authentication process, transmit authentication success notice representing the judgment to the client device 10 having transmitted the access request.

Further, the access control system 1 according to another modified example of the third exemplary embodiment may be configured so that the access control information generation server 40 transmits access permission notice to the client device 10 not via the authentication server 20.

Further, the access control system 1 according to still another modified example of the third exemplary embodiment may be configured to transmit only one of access control setting completion notice and communication filter setting completion notice, to the client device 10.

Fourth Exemplary Embodiment

Next, an access control information generation system according to a fourth exemplary embodiment of the present invention will be described with reference to FIG. 12.

An access control information generation system 100 according to the fourth exemplary embodiment includes:

a policy information storing unit (a policy information storing means) 101 for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information storing unit (a user information storing means) 102 for storing user identification information for identifying a user and role identification information for identifying a role assigned to the user in association with each other;

an access request receiving unit (an access request receiving means) 103 for receiving an access request including user identification information for identifying a user of a client device from the client device;

an access control information transmitting unit (an access control information transmitting means) 104 for generating access control information representing permission for a user identified by user identification information stored in association with the role identification information included in the stored policy information to perform access of the type represented by the action information included in the policy information, and transmitting the generated access control information to the access target device having the access target resource included in the resource group identified by the resource group identification information included in the policy information;

an address information acquiring unit (an address information acquiring means) 105 for acquiring address information representing an address for specifying a transmission source of the received access request in a communication network; and a communication filter information transmitting unit (a communication filter information transmitting means) 106 for generating communication filter information representing permission for at least one of communication that the address represented by the acquired address information is a transmission source and communication that the address is a transmission destination, and transmitting the generated communication filter information to a communication filter device relaying communication between the client device and the access target device having an access target resource included in a resource group identified by resource group identification information included in policy information including role identification information stored in association with the user identification information included in the received access request, among the stored policy information.

According to this, the access control information generation system 100 generates access control information based on policy information, and transmits the generated control information to an access target device. Thus, the access target device permits a user to perform access to an access target resource based on the received access control information.

Further, the access control information generation system 100 generates communication filter information representing permission for communication by the address of a client device having transmitted an access request. Furthermore, the access control information generation system 100 transmits the communication filter information to a communication filter device relaying communication between the client device and an access target device having an access target resource associated in the policy information with a role assigned to a user having transmitted the access request. Thus, the communication filter device permits communication by the client device.

As a result, it is possible to cause the client device to smoothly perform the access permitted by the access target device.

Although the present invention has been described above with reference to the abovementioned exemplary embodiments, the present invention is not limited to the exemplary embodiments described above. The configurations and details of the present invention may be altered in various manners that can be understood by those skilled in the art within the scope of the present invention.

The respective functions of the access control system 1 are realized by execution of programs (software) by the CPU in the respective exemplary embodiments, but may be realized by hardware such as circuits.

Further, the programs are stored in the storage device in the respective exemplary embodiments, but may be stored in a non-transitory computer-readable recording medium. For example, the recording medium is a portable medium such as a flexible disk, an optical disk, a magneto-optical disk and a semiconductor memory.

Further, as other modified examples of the abovementioned exemplary embodiments, any combinations of the aforementioned exemplary embodiments and modified examples may be employed.

[Supplementary Notes]

The whole or part of the exemplary embodiments disclosed above can be described as, but not limited to, the following supplementary notes.

(Supplementary Note 1)

An access control information generation system including:

a policy information storing means for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information storing means for storing user identification information for identifying a user and role identification information for identifying a role assigned to the user in association with each other;

an access request receiving means for receiving an access request including user identification information for identifying a user of a client device from the client device;

an access control information transmitting means for generating access control information representing permission for a user identified by user identification information stored in association with the role identification information included in the stored policy information to perform access of the type represented by the action information included in the policy information, and transmitting the generated access control information to the access target device having the access target resource included in the resource group identified by the resource group identification information included in the policy information;

an address information acquiring means for acquiring address information representing an address for specifying a transmission source of the received access request in a communication network; and a communication filter information transmitting means for generating communication filter information representing permission for at least one of communication that the address represented by the acquired address information is a transmission source and communication that the address is a transmission destination, and transmitting the generated communication filter information to a communication filter device relaying communication between the client device and the access target device having an access target resource included in a resource group identified by resource group identification information included in policy information including role identification information stored in association with the user identification information included in the received access request, among the stored policy information.

According to this, the access control information generation system generates access control information based on policy information, and transmits the generated access control information to an access target device. Consequently, the access target device permits the user to access an access target resource based on the received access control information.

Further, the access control information generation system generates communication filter information representing permission to perform communication by the address of a client device having transmitted an access request. Furthermore, the access control information generation system transmits the communication filter information to a communication filter device relaying communication between the client device and the access target device having the access target resource associated by the policy information with a role assigned to the user having transmitted the access request.

As a result, it is possible to cause the client device to smoothly perform access permitted by the access target device.

(Supplementary Note 2)

The access control information generation system according to Supplementary Note 1, including a resource device association information storing means for storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, wherein:

the access control information transmitting means is configured to use the access target device identified by the access target device identification information stored in association with the resource group identification information, as the access target device having the access target resource included in the resource group identified by the resource group identification information; and the communication filter information transmitting means is configured to use the communication filter device identified by the communication filter device identification information stored in association with the resource group identification information, as the communication filter device relaying the communication between the client device and the access target device having the access target resource included in the resource group identified by the resource group identification information.

(Supplementary Note 3)

The access control information generation system according to Supplementary Note 1 or 2, wherein the access request includes the user identification information and password information inputted by the user of the client device, the access control information generation system including an authentication processing means for executing an authentication process of judging whether the user identified by the user identification information is a valid user based on the user identification information and the password information included in the received access request, wherein the communication filter information transmitting means is configured to generate the communication filter information in a case that the user is judged to be a valid user in the authentication process.

According to this, only when the user of a client device is judged to be a valid user, it is possible to cause the client device to access an access target resource. In other words, when the user of the client device is not judged to be a valid user, it is possible to forbid the client device to access the access target resource.

(Supplementary Note 4)

The access control information generation system according to Supplementary Note 3, wherein the authentication processing means is configured to, in a case that the user is judged to be a valid user in the authentication process, transmit authentication success notice representing the judgment to the client device having transmitted the access request.

(Supplementary Note 5)

The access control information generation system according to any of Supplementary Notes 1 to 4, including an access control setting completion notice transmitting means for, in the case of receiving access control setting completion notice representing completion of setting of control of access to the access target device from the access target device, transmitting the access control setting completion notice to the client device having transmitted the access request.

According to this, it is possible to notify completion of setting of control of access to an access target resource, to a client device. Consequently, the client device can access the access target resource more smoothly.

(Supplementary Note 6)

The access control information generation system according to any of Supplementary Notes 1 to 5, including a communication filter setting completion notice transmitting means for, in the case of receiving communication filter setting completion notice representing completion of setting of control of the communication between the access target device and the client device based on the communication filter information from the communication filter device, transmitting the communication filter setting completion notice to the client device having transmitted the access request.

According to this, it is possible to notify completion of setting of control of communication between an access target device and a client device, to the client device. Consequently, the client device can access an access target resource more smoothly.

(Supplementary Note 7)

An access control information generation method including:

generating access control information representing permission for a user identified by user identification information stored in a storage device in association with role identification information included in policy information stored in the storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other, and the storage device also storing user identification information for identifying a user and role identification information for identifying a role assigned to the user in association with each other; and transmitting the generated access control information to the access target device having the access target resource included in the resource group identified by the resource group identification information included in the policy information;

receiving an access request including user identification information for identifying a user of a client device from the client device;

acquiring address information representing an address for specifying a transmission source of the received access request in a communication network; and generating communication filter information representing permission for at least one of communication that the address represented by the acquired address information is a transmission source and communication that the address is a transmission destination, and transmitting the generated communication filter information to a communication filter device relaying communication between the client device and the access target device having an access target resource included in a resource group identified by resource group identification information included in policy information including role identification information stored in the storage device in association with the user identification information included in the received access request, among the policy information stored in the storage device.

(Supplementary Note 8)

The access control information generation method according to Supplementary Note 7, including:

storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, by the storage device;

using the access target device identified by the access target device identification information stored in the storage device in association with the resource group identification information, as the access target device having the access target resource included in the resource group identified by the resource group identification information; and using the communication filter device identified by the communication filter device identification information stored in the storage device in association with the resource group identification information, as the communication filter device relaying the communication between the client device and the access target device having the access target resource included in the resource group identified by the resource group identification information.

(Supplementary Note 9)

An access control information generation device including:

a policy information storing means for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information receiving means for receiving user identification information for identifying a user of a client device and address information representing an address for specifying the client device in a communication network;

an access control information transmitting means for generating access control information representing permission for a user identified by user identification information associated with the role identification information included in the stored policy information to perform access of the type represented by the action information included in the policy information, and transmitting the generated access control information to the access target device having the access target resource included in the resource group identified by the resource group identification information included in the policy information; and a communication filter information transmitting means for generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the stored policy information.

(Supplementary Note 10)

The access control information generation device according to Supplementary Note 9, including a resource device association information storing means for storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, wherein:

the access control information transmitting means is configured to use the access target device identified by the access target device identification information stored in association with the resource group identification information, as the access target device having the access target resource included in the resource group identified by the resource group identification information; and the communication filter information transmitting means is configured to use the communication filter device identified by the communication filter device identification information stored in association with the resource group identification information, as the communication filter device relaying the communication between the client device and the access target device having the access target resource included in the resource group identified by the resource group identification information.

(Supplementary Note 11)

An access control information generation method including:

generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;

receiving user identification information for identifying a user of a client device and address information representing an address for specifying the client device in a communication network; and generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device.

(Supplementary Note 12)

The access control information generation method according to Supplementary Note 11, including:

storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, by the storage device;

using the access target device identified by the access target device identification information stored in the storage device in association with the resource group identification information, as the access target device having the access target resource included in the resource group identified by the resource group identification information; and using the communication filter device identified by the communication filter device identification information stored in the storage device in association with the resource group identification information, as the communication filter device relaying the communication between the client device and the access target device having the access target resource included in the resource group identified by the resource group identification information.

(Supplementary Note 13)

A program comprising instructions for causing an information processing device to realize:

an access control information transmitting means for generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;

a user information receiving means for receiving user identification information for identifying a user of a client device and address information representing an address for specifying the client device in a communication network; and a communication filter information transmitting means for generating communication filter information representing permission for at least one of communication that the address represented by the received address information is a transmission source and communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device.

(Supplementary Note 14)

The program according to Supplementary Note 13, wherein:

the storage device stores the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other;

the access control information transmitting means is configured to use the access target device identified by the access target device identification information stored in the storage device in association with the resource group identification information, as the access target device having the access target resource included in the resource group identified by the resource group identification information; and the communication filter information transmitting means is configured to use the communication filter device identified by the communication filter device identification information stored in the storage device in association with the resource group identification information, as the communication filter device relaying the communication between the client device and the access target device having the access target resource included in the resource group identified by the resource group identification information.

The present invention is based upon and claims the benefit of priority from Japanese patent application No. 2010-

214748, filed on Sep. 27, 2010, the disclosure of which is incorporated herein in its entirety by reference.

INDUSTRIAL APPLICABILITY

The present invention can be applied to an access control information generation system that generates information for controlling access to a resource from a client device.

DESCRIPTION OF REFERENCE NUMERALS 1 access control system
10 client device
20 authentication server
21 access request receiving unit
22 address information acquiring unit
23 authentication processing unit
24 user information transmitting unit
25 access permission notice transferring unit
30 user information management server
31 user information storing unit
40 access control information generation server
41 policy information storing unit
42 resource device association information storing unit
43 access control information transmitting unit
44 user information receiving unit
45 communication filter information transmitting unit
46 access permission notice transmitting unit
50a, 50b communication filter device
60a, 60b access target device
100 access control information generation system
101 policy information storing unit
102 user information storing unit
103 access request receiving unit
104 access control information transmitting unit
105 address information acquiring unit
106 communication filter information transmitting unit
NW communication network

The invention claimed is:

1. An access control information generation system comprising:
   a central processing unit (CPU);
   a policy information storing unit, implemented on the CPU, for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;
   a user information storing unit, implemented on the CPU, for storing user identification information for identifying a user and role identification information for identifying a role assigned to the user in association with each other;
   an access request receiving unit, implemented on the CPU, for receiving an access request including user identification information for identifying a user of a client device from the client device;
   an access control information transmitting unit, implemented on the CPU, for generating access control information representing permission for a user identified by user identification information stored in association with the role identification information included in the stored policy information to perform access of the type represented by the action information included in the policy information, and transmitting the generated access control information to the access target device having the access target resource included in the resource group identified by the resource group identification information included in the policy information;
   an address information acquiring unit, implemented on the CPU, for acquiring address information representing an address for specifying a transmission source of the received access request in a communication network;
   a communication filter information transmitting unit, implemented on the CPU, for generating communication filter information representing permission for one from among a communication that the address represented by the acquired address information is a transmission source or a communication that the address is a transmission destination, and transmitting the generated communication filter information to a communication filter device relaying communication between the client device and the access target device having an access target resource included in a resource group identified by resource group identification information included in policy information including role identification information stored in association with the user identification information included in the received access request, among the stored policy information; and
   a communication filter setting completion notice transmitting unit for, in the case of receiving a communication filter setting completion notice representing completion of setting of control of the communication between the access target device and the client device based on the communication filter information from the communication filter device, transmitting the communication filter setting completion notice to the client device having transmitted the access request.

2. The access control information generation system according to claim 1, comprising a resource device association information storing unit for storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, wherein:
   the access control information transmitting unit is configured to use the access target device identified by the access target device identification information stored in association with the resource group identification information, as the access target device having the access target resource included in the resource group identified by the resource group identification information; and
   the communication filter information transmitting unit is configured to use the communication filter device identified by the communication filter device identification information stored in association with the resource group identification information, as the communication filter device relaying the communication between the client device and the access target device having the access target resource included in the resource group identified by the resource group identification information.

3. The access control information generation system according to claim 1, wherein the access request includes the user identification information and password information inputted by the user of the client device, the access control information generation system comprising an authentication processing unit for executing an authentication process of judging whether the user identified by the user identification information is a valid user based on the user identification information and the password information included in the received access request, wherein the communication filter information transmitting unit is configured to generate the communication filter information in a case that the user is judged to be a valid user in the authentication process.

4. The access control information generation system according to claim 3, wherein the authentication processing unit is configured to, in a case that the user is judged to be a valid user in the authentication process, transmit authentication success notice representing the judgment to the client device having transmitted the access request.

5. The access control information generation system according to claim 1, comprising an access control setting completion notice transmitting unit for, in the case of receiving access control setting completion notice representing completion of setting of control of access to the access target device from the access target device, transmitting the access control setting completion notice to the client device having transmitted the access request.

6. An access control information generation method comprising:

generating access control information representing permission for a user identified by user identification information stored in a storage device in association with role identification information included in policy information stored in the storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other, and the storage device also storing user identification information for identifying a user and role identification information for identifying a role assigned to the user in association with each other; and transmitting the generated access control information to the access target device having the access target resource included in the resource group identified by the resource group identification information included in the policy information;

receiving an access request including user identification information for identifying a user of a client device from the client device;

acquiring address information representing an address for specifying a transmission source of the received access request in a communication network;

generating communication filter information representing permission for one from among a communication that the address represented by the acquired address information is a transmission source or a communication that the address is a transmission destination, and transmitting the generated communication filter information to a communication filter device relaying communication between the client device and the access target device having an access target resource included in a resource group identified by resource group identification information included in policy information including role identification information stored in the storage device in association with the user identification information included in the received access request, among the policy information stored in the storage device; and in the case of receiving a communication filter setting completion notice representing completion of setting of control of the communication between the access target device and the client device based on the communication filter information from the communication filter device, transmitting the communication filter setting completion notice to the client device having transmitted the access request.

7. The access control information generation method according to claim 6, including:

storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, by the storage device;

using the access target device identified by the access target device identification information stored in the storage device in association with the resource group identification information, as the access target device having the access target resource included in the resource group identified by the resource group identification information; and using the communication filter device identified by the communication filter device identification information stored in the storage device in association with the resource group identification information, as the communication filter device relaying the communication between the client device and the access target device having the access target resource included in the resource group identified by the resource group identification information.

8. An access control information generation device comprising:

a central processing unit (CPU);

a policy information storing unit, implemented on the CPU, for storing policy information in which role identification information for identifying a role assigned to a user, resource group identification information for identifying a resource group including at least one access target resource that is owned by an access target device and is a resource to be a target of access, and action information representing a type of access to the access target resource are associated with each other;

a user information receiving unit, implemented on the CPU, for receiving user identification information for identifying a user of a client device and address information representing an address for specifying the client device in a communication network;

an access control information transmitting unit, implemented on the CPU, for generating access control information representing permission for a user identified by user identification information associated with the role identification information included in the stored policy information to perform access of the type represented by the action information included in the policy information, and transmitting the generated access control information to the access target device having the access target resource included in the resource group identified by the resource group identification information included in the policy information;

a communication filter information transmitting unit, implemented on the CPU, for generating communication filter information representing permission for one from among a communication that the address represented by the received address information is a transmission source or a communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the stored policy information; and a communication filter setting completion notice transmitting unit for, in the case of receiving a communication filter setting completion notice representing completion of setting of control of the communication between the access target device and the client device based on the communication filter information from the communication filter device, transmitting the communication filter setting completion notice to the client device having transmitted the access request.

9. The access control information generation device according to claim 8, comprising a resource device association information storing unit, implemented on the hardware processor, for storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, wherein:

the access control information transmitting unit is configured to use the access target device identified by the access target device identification information stored in association with the resource group identification information, as the access target device having the access target resource included in the resource group identified by the resource group identification information; and the communication filter information transmitting unit is configured to use the communication filter device identified by the communication filter device identification information stored in association with the resource group identification information, as the communication filter device relaying the communication between the client device and the access target device having the access target resource included in the resource group identified by the resource group identification information.

10. An access control information generation method comprising:

generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;

receiving user identification information for identifying a user of a client device and address information representing an address for specifying the client device in a communication network; and generating communication filter information representing permission for one from among a communication that the address represented by the received address information is a transmission source or a communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device; and in the case of receiving a communication filter setting completion notice representing completion of setting of control of the communication between the access target device and the client device based on the communication filter information from the communication filter device, transmitting the communication filter setting completion notice to the client device having transmitted the access request.

11. The access control information generation method according to claim 10, including:

storing the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other, by the storage device;

using the access target device identified by the access target device identification information stored in the storage device in association with the resource group identification information, as the access target device having the access target resource included in the resource group identified by the resource group identification information; and using the communication filter device identified by the communication filter device identification information stored in the storage device in association with the resource group identification information, as the communication filter device relaying the communication between the client device and the access target device having the access target resource included in the resource group identified by the resource group identification information.

12. A non-transitory computer-readable recording medium storing a program comprising instructions for causing an information processing device to realize:
an access control information transmitting unit for generating access control information representing permission for a user identified by user identification information associated with role identification information included in policy information stored in a storage device to perform access of a type represented by action information included in the policy information, the storage device storing policy information in which role identification information for identifying a role assigned to a user, resource group identification information for identifying a resource group including at least one access target resource that is owned by an access target device and is a resource to be a target of access, and action information representing a type of access to the access target resource are associated with each other; and transmitting the generated access control information to the access target device having the access target resource included in the resource group identified by the resource group identification information included in the policy information;
a user information receiving unit for receiving user identification information for identifying a user of a client device and address information representing an address for specifying the client device in a communication network; and
a communication filter information transmitting unit for generating communication filter information representing permission for one from among a communication that the address represented by the received address information is a transmission source or a communication that the address is a transmission destination, and transmitting the generated communication filter information to a communication filter device relaying communication between the client device and the access target device having an access target resource included in a resource group identified by resource group identification information included in policy information including role identification information associated with the received user identification information, among the policy information stored in the storage device; and
a communication filter setting completion notice transmitting unit for, in the case of receiving a communication filter setting notice representing completion of setting of control of the communication between the access target device and the client device based on the communication filter information from the communication filter device, transmitting the communication filter setting completion notice to the client, device leaving transmitted the access request.

13. The non-transitory computer-readable recording medium storing the program according to claim 12, wherein:
the storage device stores the resource group identification information, access target device identification information for identifying the access target device having the access target resource included in the resource group identified by the resource group identification information, and communication filter device identification information for identifying the communication filter device relaying the communication between the client device and the access target device having the access target resource included in the resource group identified by the resource group identification information, so as to be associated with each other;
the access control information transmitting unit is configured to use the access target device identified by the access target device identification information stored in the storage device in association with the resource group identification information, as the access target device having the access target resource included in the resource group identified by the resource group identification information; and
the communication filter information transmitting unit is configured to use the communication filter device identified by the communication filter device identification information stored in the storage device in association with the resource group identification information, as the communication filter device relaying the communication between the client device and the access target device having the access target resource included in the resource group identified by the resource group identification information.

* * * * *